United States Patent [19]
Sosnoski et al.

[11] Patent Number: 5,239,890
[45] Date of Patent: Aug. 31, 1993

[54] SHRUNK TEFLON HELIX COVER

[75] Inventors: Joseph Sosnoski, Norristown; Frank F. Adelman, Bensalem, both of Pa.

[73] Assignee: Teleflex Incorporated, Limerick, Pa.

[21] Appl. No.: 662,715

[22] Filed: Mar. 1, 1991

[51] Int. Cl.⁵ .............................................. F16C 1/10
[52] U.S. Cl. ................................ 74/501.5 R; 74/502.5
[58] Field of Search ................ 74/502.4, 502.5, 502.6

[56] References Cited

U.S. PATENT DOCUMENTS

| | | | |
|---|---|---|---|
| 2,083,937 | 6/1937 | Begg | 74/502.5 X |
| 2,187,873 | 1/1940 | Bratz | 74/502.5 X |
| 2,380,015 | 7/1945 | Batterson et al. | 74/502.5 |
| 2,382,966 | 8/1945 | Arens | 74/502.5 |
| 2,821,092 | 1/1958 | Cordora et al. | 74/502.5 |
| 3,192,795 | 7/1965 | Pierce | 74/502.5 |
| 4,038,881 | 8/1977 | Conrad | 74/502.5 X |
| 4,193,319 | 3/1980 | Langford | 74/501 |
| 4,300,408 | 11/1981 | Yoshifuji | 74/501 |
| 4,378,712 | 4/1983 | Yoshifuji | 74/502.5 |
| 4,402,160 | 9/1983 | Brusasco | 74/502.5 X |
| 4,541,303 | 9/1985 | Kuzunishi | 74/502.5 |
| 4,951,523 | 8/1990 | Shiota et al. | 74/502.5 |

Primary Examiner—Carl D. Friedman
Assistant Examiner—Winnie Yip
Attorney, Agent, or Firm—Reising, Ethington, Barnard, Perry & Milton

[57] ABSTRACT

A motion transmitting remote control cable assembly (10) of the type for transmitting motion in a curved path includes a conduit (12) and a core element (16) slideably disposed therein. The core element includes a plurality of long lay wires (24) wound in helical fashion and a single strand (18) wrapped helically around the plurality of wires to define a helical crest surface (20) for contacting the conduit. The assembly is characterized by including a teflon liner (22) which is shrunk fit over the core element (16) for reducing friction between the core element and the conduit (12).

8 Claims, 1 Drawing Sheet

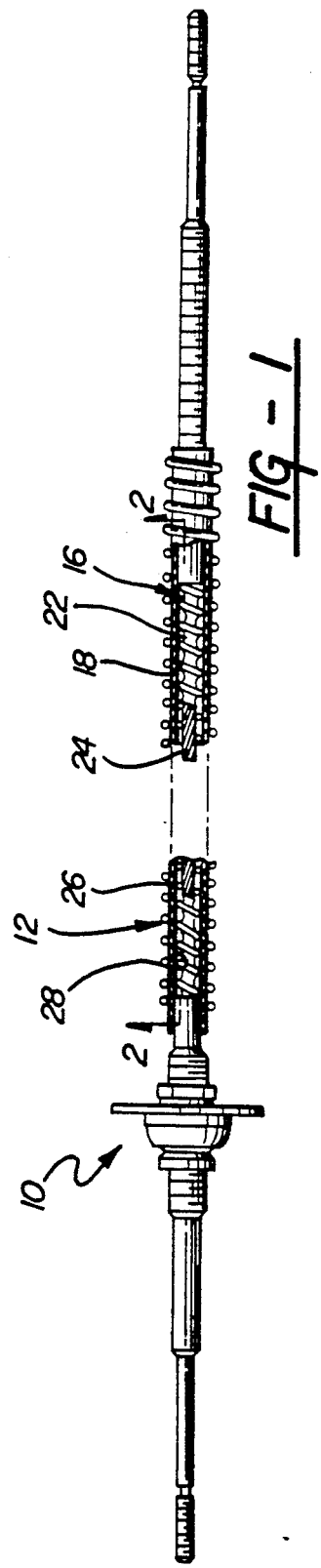
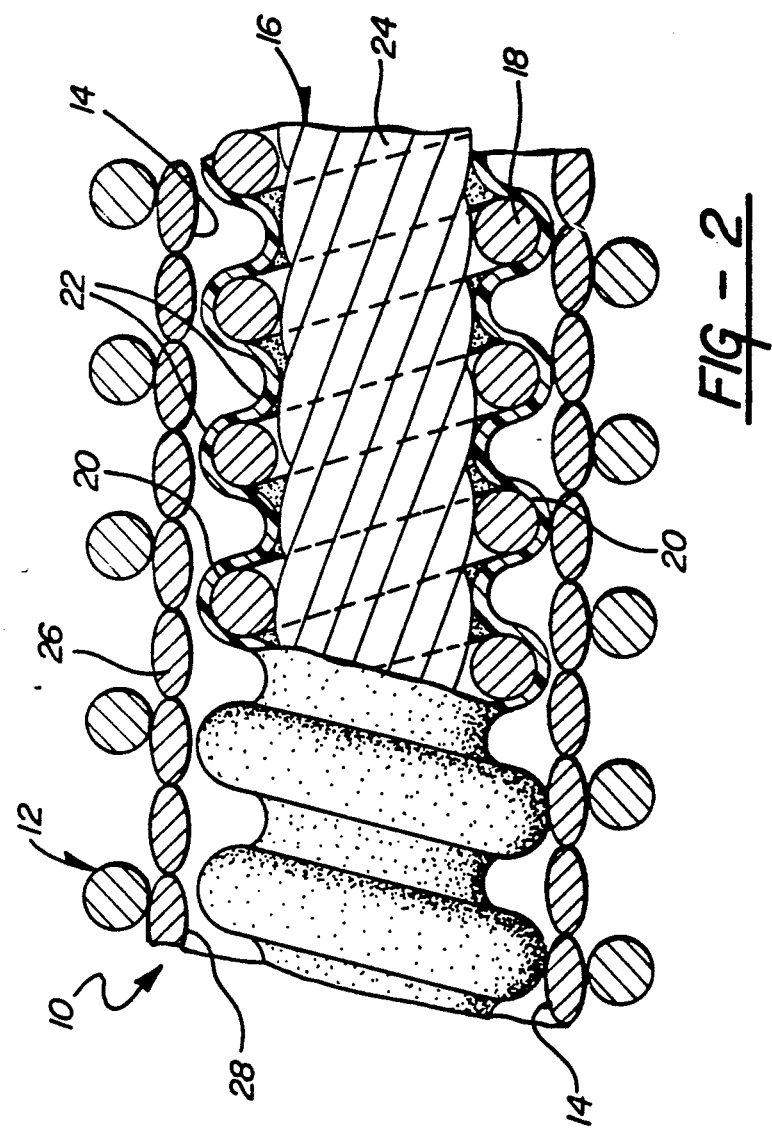

000

SHRUNK TEFLON HELIX COVER

TECHNICAL FIELD

The subject invention relates to motion transmitting remote control cable assemblies of the type for transmitting motion in a curved path, and more particularly to a means for reducing friction between a conduit and a core element slideably disposed therein.

BACKGROUND OF THE INVENTION

In motion transmitting remote control cable assemblies it is desirable to reduce friction between a conduit and a core element slideably disposed therein. This is because friction between the conduit and core element inhibits sliding of the core element within the conduit. Friction also increases wearing on the respective contacting surfaces of the core element and conduit.

It is well known in the art to include some low friction coating on either the core element or inner surface of the conduit, or both. The U.S. Pat. No. 4,300,408 to Yoshifuji teaches coating the core element with a low friction coating while also providing a low friction lining on the inner surface of the conduit. The U.S. Pat. No. 4,193,319 to Langford discloses a core element covered with a helical wrap of tape having a low friction surface.

None of the prior art patents suggest taking the further friction-reducing step of reducing the core element surface area contacting the inner surface of the conduit, and providing a smooth coating on such a surface.

SUMMARY OF THE INVENTION

A motion transmitting remote control cable assembly for transmitting motion in a curved path comprises a conduit having an inner surface and a core element disposed in said conduit for transmitting motion. The assembly further comprises a single strand wrapped helically in spaced convolutions around the core element to define a helically extending crest surface. The invention is characterized by including smooth liner means disposed over and conforming in shape to the crest surface of the thread so that only the smooth liner means on the crest surface contacts the inner surface of the conduit.

Thus, the subject invention reduces friction between the core element and the conduit by reducing surface area contact therebetween. The core element further includes a smooth liner disposed over and conforming in shape to the core element for further reducing friction between the contacting surfaces.

FIGURES IN THE DRAWINGS

Other advantages of the present invention will be readily appreciated as the same becomes better understood by reference to the following detailed description when considered in connection with the accompanying drawings wherein:

FIG. 1 is a side view of the invention partially in cross-section;

FIG. 2 is a section view of the subject invention taken along line 2—2 in FIG. 1.

DESCRIPTION OF THE PREFERRED EMBODIMENT

A motion transmitting remote control cable assembly generally shown at 10 for transmitting motion in a curved path comprises a conduit or casing generally indicated at 12 having an inner surface 14 and a core element or helix cable generally indicated at 16 disposed in said conduit for transmitting motion. The assembly further includes a single strand 18 wrapped helically in spaced convolutions around said core element 16 to define a helically extending crest surface 20. The assembly further includes smooth liner means 22 disposed over and conforming in shape to the crest surface 20 of the thread so that only the smooth liner means 22 on the crest surface contacts the inner surface 14 of the conduit 12.

The core element 16 includes a plurality of helically wound, long lay strands 24. These lay strands 24 are in turn surrounded by a single strand 18 helically wound thereabout in spaced convolutions. The single strand 18 wound helically defines a crest surface 20 elevated above the lay strands 24. The helical crest surface 20 is the only surface on the core element 16 capable of contacting the inner surface 14 of the conduit 12. In the preferred embodiment all of the strands 18,24 are stainless steel, though other materials maybe used.

The liner 22 is a continuous and tube-shaped length of Teflon shrink tubing. The liner 22 can be purchased pre-stretched to a suitable diameter. When heat is applied to the liner 22, the liner will shrink to a smaller diameter determined by the "memory" of the Teflon.

At the very least, the liner 22 must extend over the crest surface 20. Preferably, the liner 22 is continuous and extends between the spaced convolutions. The liner 22 should contact the core element 16 between the spaced convolutions. The liner 22 is shrunk fit over the crest surface 20 and between the spaced convolutions. In other words, when the liner 22 is shrunk fit over the core element 16, the liner conforms in shape to the core element.

This liner 22 shrunk fit over the core element 16 and having the crest surface 20 provides a smooth surface of contact between the core element 16 and the inner surface 14 of the conduit 12. Since only the crest surface 20 of the core element 16 contacts the inner surface 14 of the conduit 12, friction is less than if the entire surface of the core element 16 contacted the inner surface of the conduit. This increased contact would occur if the core element 16 had a flat surface; i.e., one with a circular cross section. In theory, contact between the core element 16 and the inner surface 14 of the conduit 12 could be, depending on the snugness of the fit therebetween, as much as the entire helical crest surface and as little as a series of points. In contrast, contact between the core element having a circular cross-section could be as much as the entire outer surface of the core element and as little as a line. Therefore, this latter coil will always have more surface contact with the inner surface 14 of the conduit 12 than will the subject core element 16.

The conduit or casing 12 is made from a plurality of long lay wires 26 wound helically to define a hollow core 28 which receives the core element 16. The lay wires 26 are typically stainless steel, though other suitable materials may be used. In fact, the conduit 12 may be any conduit which will slideably support the core element 16.

The method of coating a core element 16 with a low friction coating for reducing friction between a conduit 12 and a core element 16 slideably disposed in the conduit includes the steps of disposing a hollow liner 22 over the core element 16 and shrinking the liner to conform to the shape of the core element. The liner 22 should be stretched prior to shrinking over the core element 16 and after the liner 22 is disposed over the core element. The method also includes the step of applying heat to the liner 22 to shrink the liner 22 to the core element 16 after the liner is disposed over the core element. Heat is typically applied to the liner 22 as a length of the core element 16 with the liner disposed thereon is passed through an infrared energy machine (not shown). Other means for heating the liner 22 may be used, including hand heat guns or ovens, though these are deemed less suitable for rapid production of Teflon lined core elements.

The invention has been described in an illustrative manner, and it is to be understood that the terminology which has been used is intended to be in the nature of words of description rather than limitation.

Obviously, many modifications and variations of the present invention are possible in light of the above teachings. It is therefore to be understood that within the scope of the appended claims wherein reference numerals are merely for convenience and are not to be in any way limiting, the invention may be practiced otherwise than is specifically described.

What is claimed is:

1. A motion transmitting remote control cable assembly (10) for transmitting motion comprising:

a conduit (12) having an inner surface (14);

a core element (16) slideably supported in said conduit (12) for transmitting motion;

a single strand (18) wrapped helically in spaced convolutions around said core element (16) to define a helically extending crest surface (20);

characterized by including a smooth liner (22) disposed on, and conforming in shape to said crest surface (20) of said strand so that said liner moves with said crest surface on said core element and only said smooth liner (22) on said crest surface (20) contacts said inner surface (14) of said conduit (12).

2. An assembly (10) as set forth in claim 1 further characterized by said liner (22) being continuous and extending between said spaced convolutions.

3. An assembly (10) as set forth in claim 2 further characterized by said liner (22) contacting said core element (16) between said spaced convolutions.

4. An assembly (10) as set forth in claim 3 further characterized by said liner (22) being shrunk fit over said crest surface (20) and between said spaced convolutions.

5. An assembly (10) as set forth in claim 4 further characterized by said core element (16) including a plurality of helically wound long lay strands (24).

6. An assembly (10) as set forth in claim 5 further characterized by said liner (22) being teflon.

7. An assembly (10) as set forth in claim 6 further characterized by said conduit (12) including a plurality of helically wound long lay strands (26) defining a hollow center (28) for receiving said core element (16).

8. An assembly (10) as set forth in claim 7 further characterized by said core element (16) and said conduit (12) being made of stainless steel.

* * * * *